United States Patent
Nerheim

(10) Patent No.: US 7,950,364 B2
(45) Date of Patent: May 31, 2011

(54) PRECHAMBER FOR A GAS ENGINE

(75) Inventor: Lars Magne Nerheim, Hordvik (NO)

(73) Assignee: Rolls-Royce Marine AS, Engines-Bergen, Bergen (NO)

(*) Notice: Subject to any disclaimer, the term of this patent is extended or adjusted under 35 U.S.C. 154(b) by 950 days.

(21) Appl. No.: 11/664,077

(22) PCT Filed: Sep. 27, 2005

(86) PCT No.: PCT/NO2005/000357
§ 371 (c)(1),
(2), (4) Date: Aug. 23, 2007

(87) PCT Pub. No.: WO2006/043818
PCT Pub. Date: Apr. 27, 2006

(65) Prior Publication Data
US 2010/0132660 A1 Jun. 3, 2010

(30) Foreign Application Priority Data
Sep. 27, 2004 (NO) .................................. 20044078

(51) Int. Cl.
F02B 19/16 (2006.01)
F02B 19/12 (2006.01)
F02B 19/18 (2006.01)
(52) U.S. Cl. .......... 123/259; 123/260; 123/267; 123/293
(58) Field of Classification Search .................. 123/256, 123/260, 262, 263, 266, 267, 286, 293, 259, 123/275, 276
See application file for complete search history.

(56) References Cited

U.S. PATENT DOCUMENTS

| | | | | |
|---|---|---|---|---|
| 2,148,505 A | * | 2/1939 | Rosen | 123/276 |
| 5,024,193 A | * | 6/1991 | Graze, Jr. | 123/293 |
| 5,222,993 A | * | 6/1993 | Crane | 123/266 |
| 5,947,076 A | * | 9/1999 | Srinivasan et al. | 123/267 |
| 6,854,439 B2 | * | 2/2005 | Regueiro | 123/263 |

FOREIGN PATENT DOCUMENTS

EP 1091104 A1 * 4/2001

* cited by examiner

Primary Examiner — Willis R Wolfe, Jr.
(74) Attorney, Agent, or Firm — Francis C. Hand; Carella, Byrne, Cecchi

(57) ABSTRACT

The invention relates to a device for a prechamber unit (10) of a gas engine, comprising a prechamber unit (10) in the form of an elongated body (12) arranged to be placed in an upper part of the engine's cylinder, and where the elongated body (12) comprises a prechamber gas valve (20) and an ignition means (22) arranged side by side, and one or more channels (24) for supply of fuel gas via the prechamber gas valve (20) to a prechamber (26) in a lower part of the elongated body (12). Said prechamber (26) comprises further in the axial direction, an elongated cavity (28) with nozzles (30) placed at the end for supply of ignited fuel gas to the engine's cylinder with the help of the ignition means (22). The elongated cavity (28) in the prechamber (26) is divided into several connected, and in cross-section, graduated or tapered cavities (28a, 28b, 28c), where an uppermost cavity (28a) is widest in the cross-sectional direction and a bottom cavity (28c) is narrowest in the cross-sectional direction.

11 Claims, 1 Drawing Sheet

PRECHAMBER FOR A GAS ENGINE

The present invention relates to a device for a prechamber unit of a gas engine, comprising a prechamber unit in the form of an elongated body arranged to be placed in an upper part of the engine's cylinder, and where the elongated body comprises a prechamber gas valve and an ignition means arranged side by side, and one or more channels for supply of fuel gas via the prechamber gas valve to a prechamber in a lower part of the elongated body and where said prechamber comprises an elongated cavity in the axial direction with nozzles placed at the end for supply of ignited fuel gas to the engine's cylinder with the help of the ignition means.

The invention relates in the main to a prechamber for a lean-burn gas engine, even if the invention can, in principle, also be used in other gas engines. In a lean-burn gas engine (Otto engine) the cylinder is filled with a homogenous, lean mixture of air and fuel gas. To achieve a steady and safe ignition of the charge, an ignition amplifier in the form of a prechamber is often used, where the charge is made richer in that the fuel gas is supplied through a separate prechamber gas valve, and where an ignition means in the form of, for example, a spark plug or pilot injection valve is located. For the present invention, so much work has been carried out in making the relative amount of energy that is released in the prechamber as small as possible. The reason for this is that the prechamber is a substantial contributor to the formation of NOx during the combustion. Furthermore, the prechamber is subjected to high thermal loads and requires much cooling. Reduced size and subsequent reduced amount of energy released in the prechamber also leads to a gain in the form of lower thermal load and reduced Wear on the ignition means and prechamber gas valve.

Prechambers of these types are mainly intended for use in engines with bores from around 200 mm and upward. This is due to physical limitations in relation to how small the prechamber in reality can be made, but must not be viewed as limiting for the invention. The technology is applicable both to stationary engines and for propulsion engines with variable revolutions per minute.

Advantages of the present invention are that the volume of the prechamber can constitute a very small part of the compression volume. In an advantageous embodiment, it is probable that this volume can be less than 1.2% of the compression volume. However, it must be pointed out that the volume can also be greater if this is required.

Other advantages of the invention are that there can be a rapid cross-section transfer in the prechamber nozzle to generate turbulence during injection of the prechamber. Furthermore, the prechamber gas valve can be placed as close to the prechamber as possible to achieve a rapid valve response, minimal transport delay and good control of the formation of the mixture in the prechamber. The shape of the prechamber gas valve can also be modified to contribute further to the above mentioned advantages.

Furthermore, the ignition means and the prechamber gas supply can be placed outside the central line of the prechamber to achieve a compact design, good mixture formation and good cooling and the nozzle part of the prechamber can be specially made to provide an optimal distribution of the released energy.

Prechambers for such gas engines are, of course, previously known. However, it is a disadvantage with most of the solutions that a relatively large amount of a rich charge must be used, which thereby contributes to formation of much NOx during the combustion. Use of a relatively large amount of rich charge leads to much heat being formed in the prechamber. This in turn leads to material thickness and material quality, etc., for the prechamber having to be increased to adapt to the development of heat. The complexity and manufacturing costs will thereby also increase.

From prior art, U.S. Pat. No. 5,947,076 and EP 1091104 A1 shall be pointed out among others. These documents show a prechamber of a combustion engine, where the prechamber is supplied with fuel and has a spark plug. Furthermore, there are nozzle openings at the outlet of the prechamber and into the engine's cylinder itself. The prechamber in both documents has tapered cavities, where an upper cavity is widest in the cross-sectional direction and the bottom cavity is narrowest in the cross-sectional direction. However, graduated cavities are not known from said documents.

From U.S. Pat. No. 5,222,993, a prechamber of a gas engine that is divided into two chambers, namely a first and a second chamber, is known. The second chamber has a supply of fuel and a spark plug. There is an opening between the chambers to create turbulence from the second chamber to the first chamber. Furthermore, there is a graduation in the first chamber to an opening that goes out in the main combustion chamber. However, nozzles at the opening from the prechamber to the main combustion chamber itself are not known from this document.

It is an object of the present invention to provide a prechamber unit having a prechamber where the above mentioned disadvantages are avoided and which has a compact design, good mixture formation and good cooling.

This object is achieved with a prechamber divided into several connected and, in cross-section, graduated cavities where an upper cavity is widest in the cross-sectional direction and a cavity at the bottom is narrowest in the cross-sectional direction Advantageous embodiments are characterised in that the elongated cavity can be arranged centrally in the center line of the elongated body, and that the uppermost cavity that receives fuel gas frnm the prechamber gas valve and which comprises the ignition mechanism of the ignition means, runs over into a cavity, smaller in the cross-sectional direction, and which in turn runs over into an even smaller cavity in the cross-sectional direction.

The bottom cavity preferably comprises said nozzles for supply of ignited fuel gas to the engine's cylinder. Furthermore, the uppermost cavity can be shaped as a cylindrical chamber with rounded corners in cross-section. The middle cavity can be in the form of a circular-cylindrical boring, where a shoulder is provided in the transition between the uppermost chamber and said boring. Correspondingly, the bottom cavity can be shaped as a mainly circular-cylindrical boring, where a shoulder is provided in the transition between the boring of the middle cavity and the boring of the bottom cavity. Said shoulders can be arranged to generate turbulence during injection in the prechamber.

The lower part of the elongated body, encompassing the whole or parts of the prechamber, can be releasable attached. Alternatively, the prechamber can be manufactured integrated with the elongated body.

It is preferred that the prechamber gas valve and the ignition means are arranged side by side in their own separate boring in the elongated body, where each boring is placed, cross-sectionally, completely, or partially, on each side of the center line of the elongated body.

For supply of fuel gas to the uppermost chamber, a non-return valve can be arranged as a prechamber gas valve.

In an alternative embodiment, the prechamber can be divided into more than three connected and cross-sectionally graduated or tapered cavities, where the uppermost cavity is widest in the cross-sectional direction and the bottom cavity is narrowest in the cross-sectional direction.

In an alternative embodiment, the volume of the prechamber can also constitute less than, or correspond to, 1.2% of the compression volume.

The invention shall now be described in more detail with reference to the enclosed drawings, in which.

When the prechamber is referred to in a combustion-technical context, and also in this patent application, then one means the prechamber volume, i.e. the volume of the nozzle part independent of the construction/division. As a structural part, the whole unit can be defined as a prechamber unit, which in the main is comprised of a prechamber retainer (upper part) and a prechamber nozzle (lower part).

Figure 1:
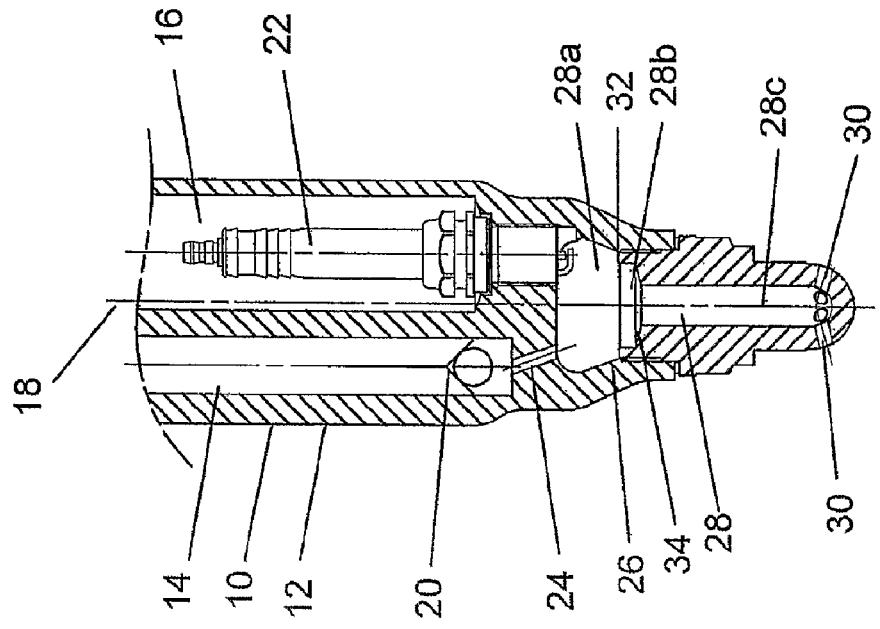
FIG. 1 shows an embodiment of the present invention.
Figure 2:
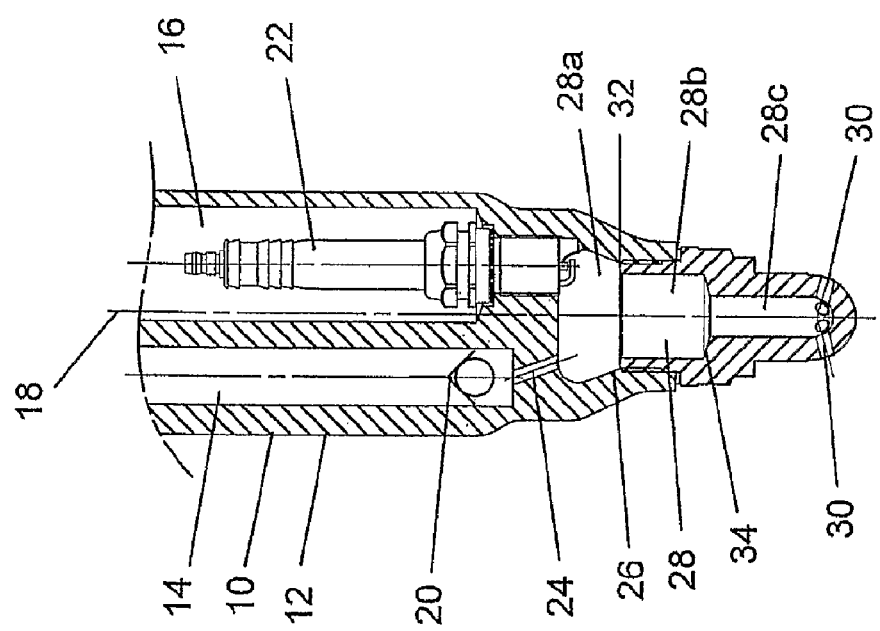
FIG. 2 shows an alternative embodiment of the present invention.

FIGS. 1 and 2 shows a partial cross-section of two prechamber units. The difference between the two units is in the shape of the prechamber. Otherwise they are formed similarly. Furthermore, it shall be noted that the form of the prechamber can in practice be different from what is shown in the figures, i.e. it can have any form which lies between what is shown and indeed also outside what is shown.

As the figures show, the prechamber unit 10 comprises an elongated body 12 and which, in an upper part, comprises two separate borings 14, 16 arranged side by side. Each boring 14, 16 are placed completely, or partially, aside the center line 18 of the elongated body 12. The one boring 14 preferably comprises a prechamber gas valve 20, for example in the form of a non-return valve such as a ball valve, and the other boring 16 comprises preferably an ignition means 22, for example in the form of a spark plug, a pilot injection valve, or another similar ignition mechanism. It shall further be pointed out that the prechamber gas valve 20 can be any type suitable for use in a prechamber unit of a gas engine.

Supply of fuel gas to the prechamber gas valve 20 is brought about in a known way and will therefore not be described in more detail as it is known to one skilled in the art. From the prechamber gas valve 20, fuel gas is supplied via a channel 24, or more channels, to a prechamber 26 in the lower part of the elongated body 12. It is important that the prechamber gas valve is placed as close to the prechamber as possible, i.e. that the channel 24 is as short as possible, to achieve fast valve response, minimal transport delay and good control of the mixture formation in the prechamber.

The prechamber 26 comprises a cavity 28 extending in the axial direction. The elongated cavity 28 is divided into several connected and, in cross-section, graduated or tapered cavities 28a, 28b, 28c. The uppermost cavity 28a is preferably widest in the cross-sectional direction and the bottom cavity 28c is preferably narrowest in the cross-sectional direction. The middle cavity 28b, if provided, has consequently a cross-section that lies between the other two cavities. The bottom cavity 28c comprises nozzles 30 for supply of ignited fuel gas to the engine's cylinder. Furthermore, the elongated cavity 28 is arranged centrally in the center line of the elongated body 12. In a preferred embodiment the uppermost cavity 28a, which receives fuel gas from the prechamber gas valve 20, and which comprises the ignition mechanism of the ignition means 22 runs by definition over into a cavity 28b which is narrower in the cross-sectional direction and which in turn runs into an even narrower cavity 28c in the cross-sectional direction. Such a form for the prechamber is not previously known, and the relative amount of energy which is released in the prechamber is thereby as small as possible.

FIG. 1 show that the uppermost cavity 28a is preferably formed as a cylindrical chamber with rounded corners in cross section, but it can of course be formed in other ways than shown here. Furthermore, the preferred form for the middle cavity 28b is as a circular-cylindrical boring where a shoulder 32 is provided in the transition between the uppermost chamber and said boring. The bottom cavity 28c is also preferably shaped as a mainly circular-cylindrical boring, where a shoulder 34 is provided in the transition between the boring of the middle cavity 28b and the boring of the bottom cavity 28c. FIG. 2 shows an alternative embodiment of the same cavities as shown in FIG. 1 by definition, but in the longitudinal direction, the middle and the bottom boring differ from what is shown in FIG. 1. In FIG. 2, the bottom boring with the nozzles is much longer in the longitudinal direction and the middle boring is much shorter in the longitudinal direction than shown in FIG. 1. How long the different chambers and borings shall be depends on the type of motor which the prechamber unit is to be mounted on, and also the area of application of the engine As mentioned, the embodiments shown in FIGS. 1 and 2 are only examples of shapes of the prechamber and the prechamber can therefore have other forms than what is shown here.

The shoulder 32 in the transition between the upper chamber 28a and the middle boring 28b will contribute to formation of turbulence in the prechamber. Correspondingly, the shoulder 34 in the transition between the middle boring 28b and the bottom boring 28c will also contribute to the mentioned formation of turbulence in the prechamber. The degrees of the shoulders 32, 34 can vary depending on the required turbulence, type of engine, etc.

A preferred prechamber with three connected cavities is shown in the figures. However, it shall be pointed out that the prechamber can alternatively be shaped with only two connected cavities, or alternatively more than three connected cavities.

The prechamber is, as mentioned, a substantial contributor to formation of NOx during the combustion, and furthermore, the prechamber is exposed to high thermal loads and requires good cooling. In the present invention, a prechamber unit of a reduced size and with a reduced amount of energy released in the prechamber is provided. This also gives a gain in the form of a lower thermal load and reduced wear on the ignition means and the prechamber gas valve. Calculations and tests have shown that the lifetime of the components can at least be doubled. Furthermore, reduced thermal load can yield a gain in the manufacture of the prechamber unit, for example, in that the material thickness or quality of the material can be reduced.

The invention claimed is:

1. A prechamber unit for a gas engine comprising
   an elongated body for placement in an upper part of an engine cylinder;
   a prechamber in a lower part of said body having an elongated cavity extending in an axial direction, said cavity being divided into at least two coaxially disposed cross-sectionally graduated cavities with a graduated shoulder between said graduated cavities for generating turbulence within said graduated cavities, an upper one of said graduated cavities being widest in the cross-sectional direction and a bottom one of said graduated cavities being narrowest in the cross-sectional direction;
   a prechamber gas valve in said body for delivering fuel gas into said upper one of said graduated cavities;
   an ignition means in said body disposed in side by side relation to said prechamber gas valve for igniting fuel gas in said upper one of said graduated cavities; and a plurality of nozzles communicating with said bottom one of said graduated cavities to expel ignited fuel therefrom to the engine cylinder.

2. A prechamber unit as set forth in claim 1 wherein said lower part of said elongated body is releasably attached to the remainder of said elongated body.

3. A prechamber unit as set forth in claim 1 wherein said lower part of said elongated body is integral with the remainder of said elongated body.

4. A prechamber unit as set forth in claim 1 wherein said prechamber gas valve and said ignition means are diametrically spaced apart on opposite sides of said central axis of said elongated body.

5. A prechamber unit as set forth in claim 1 wherein said prechamber gas valve is a non-return valve.

6. A prechamber unit as set forth in claim 1 characterised in that the volume of said prechamber constitutes less than 1.2% of the compression volume.

7. A prechamber unit as set forth in claim 1 wherein said elongated cavity is disposed on a central axis of said elongated body and includes three of said coaxially disposed cross-sectionally graduated cavities wherein an intermediate one of said graduated cavities is narrower in said cross sectional direction than said upper one of said graduated cavities and wider in said cross sectional direction than said bottom one of said graduated cavities.

8. A prechamber unit as set forth in claim 7 wherein said uppermost one of said graduated cavities is shaped as a cylindrical chamber with rounded corners in cross-section.

9. A prechamber unit as set forth in claim 8 wherein said intermediate one of said graduated cavities is shaped as a circular-cylindrical boring and wherein said shoulder is provided between said uppermost one of said graduated cavities and said boring.

10. A prechamber unit as set forth in claim 9 wherein said bottom one of said graduated cavities is shaped as a mainly circular-cylindrical boring and wherein a second shoulder is provided between said intermediate one of said graduated cavities and said bottom one of said graduated cavities.

11. A prechamber unit as set forth in claim 10 wherein each said shoulder is arranged to generate turbulence in said prechamber.

\* \* \* \* \*